US010796701B2

(12) United States Patent
Kishida

(10) Patent No.: US 10,796,701 B2
(45) Date of Patent: Oct. 6, 2020

(54) OPERATOR ASSESSMENT SYSTEM

(71) Applicant: SHARP KABUSHIKI KAISHA, Sakai, Osaka (JP)

(72) Inventor: Hiroyuki Kishida, Sakai (JP)

(73) Assignee: SHARP KABUSHIKI KAISHA, Sakai, Osaka (JP)

(*) Notice: Subject to any disclaimer, the term of this patent is extended or adjusted under 35 U.S.C. 154(b) by 126 days.

(21) Appl. No.: 16/309,707

(22) PCT Filed: Feb. 21, 2017

(86) PCT No.: PCT/JP2017/006289
§ 371 (c)(1),
(2) Date: Dec. 13, 2018

(87) PCT Pub. No.: WO2017/217014
PCT Pub. Date: Dec. 21, 2017

(65) Prior Publication Data
US 2019/0139553 A1 May 9, 2019

(30) Foreign Application Priority Data
Jun. 17, 2016 (JP) .................... 2016-121182

(51) Int. Cl.
G10L 17/00 (2013.01)
G06F 13/00 (2006.01)
(Continued)

(52) U.S. Cl.
CPC ............ *G10L 17/005* (2013.01); *G06F 3/167* (2013.01); *G06F 13/00* (2013.01); *H04L 12/282* (2013.01);
(Continued)

(58) Field of Classification Search
CPC ...... G10L 17/005; H04W 4/029; H04W 4/80; G06F 3/167; G06F 13/00; H04L 12/2809;
(Continued)

(56) References Cited
U.S. PATENT DOCUMENTS
9,092,971 B2 * 7/2015 Symoen ................. G08C 17/02
10,178,530 B2 * 1/2019 Forood ..................... H04W 4/70
(Continued)

FOREIGN PATENT DOCUMENTS
EP          2509334 A1 * 10/2012 ............. G08C 17/00
JP      2006-067417 A     3/2006
(Continued)

*Primary Examiner* — Mohammad K Islam
(74) *Attorney, Agent, or Firm* — ScienBiziP, P.C.

(57) ABSTRACT

The present invention provides a presumable operator determining system which allows determining, at minimum cost, a presumable operator who has operated a door or a button of a home appliance or operated the home appliance by voice control. A presumable operator determining system (100), which determines a presumable operator who has operated a home appliance (10) provided in a house (40), has pre-registered therein unique information of respective communication terminal devices (20) such that the unique information are respectively associated with users who operate the home appliance (10), the communication terminal devices (20) being respectively carried by the users and brought along by the users when the users go out. In a case where the home appliance (10) is operated, the presumable operator determining system (100) (i) searches, with use of a communication section included in the home appliance (10), for a communication terminal device (20) connected to a relay station (30) for wireless LAN in the house (40) among registered communication terminal devices (20) and (ii) determines a presumable operator among a user(s) associated with a terminal device(s) (20) detected through the search.

8 Claims, 10 Drawing Sheets

(51) Int. Cl.
*H04W 4/029* (2018.01)
*H04L 12/28* (2006.01)
*G06F 3/16* (2006.01)
*H04W 4/80* (2018.01)

(52) U.S. Cl.
CPC ......... *H04L 12/2809* (2013.01); *H04W 4/029* (2018.02); *H04L 2012/285* (2013.01); *H04L 2012/2841* (2013.01); *H04W 4/80* (2018.02)

(58) Field of Classification Search
CPC ........... H04L 12/282; H04L 2012/2841; H04L 2012/285
See application file for complete search history.

(56) References Cited

U.S. PATENT DOCUMENTS

| | | | | |
|---|---|---|---|---|
| 10,349,224 | B2* | 7/2019 | Segal | H04L 67/18 |
| 10,410,630 | B2* | 9/2019 | Weng | G06F 21/32 |
| 10,455,362 | B1* | 10/2019 | Meissner | H04L 67/306 |
| 10,521,189 | B1* | 12/2019 | Ryabov | G06F 40/117 |
| 10,679,058 | B2* | 6/2020 | Wexler | G08B 21/18 |
| 2008/0157936 | A1* | 7/2008 | Ebrom | H04L 12/2825 |
| | | | | 340/286.02 |
| 2010/0013609 | A1* | 1/2010 | Symoen | G08C 17/02 |
| | | | | 340/12.32 |
| 2011/0312278 | A1* | 12/2011 | Matsushita | G08C 17/02 |
| | | | | 455/66.1 |
| 2012/0019674 | A1* | 1/2012 | Ohnishi | G08C 17/00 |
| | | | | 348/207.1 |
| 2016/0072638 | A1* | 3/2016 | Amer | F24F 11/30 |
| | | | | 398/106 |
| 2016/0150350 | A1* | 5/2016 | Ingale | H04W 12/08 |
| | | | | 370/255 |
| 2016/0218884 | A1* | 7/2016 | Ebrom | H05B 6/668 |
| 2016/0373270 | A1* | 12/2016 | Yang | H04L 12/2807 |
| 2018/0247654 | A1* | 8/2018 | Bhaya | G10L 15/22 |
| 2018/0277112 | A1* | 9/2018 | Kim | G10L 15/08 |
| 2019/0173684 | A1* | 6/2019 | Ocher | H04L 12/281 |
| 2019/0251975 | A1* | 8/2019 | Choi | H04L 63/083 |
| 2019/0334733 | A1* | 10/2019 | Jaiswal | H04L 67/22 |
| 2019/0355355 | A1* | 11/2019 | Tomita | G06F 21/608 |
| 2019/0384389 | A1* | 12/2019 | Kim | G02B 27/0172 |
| 2020/0177407 | A1* | 6/2020 | Nakamura | H04L 41/0806 |

FOREIGN PATENT DOCUMENTS

| | | |
|---|---|---|
| JP | 2012-164056 A | 8/2012 |
| JP | 2014-089525 A | 5/2014 |
| JP | 2015-225258 A | 12/2015 |
| JP | 2016-035614 A | 3/2016 |

* cited by examiner

| USER | UNIQUE INFORMATION OF COMMUNICATION TERMINAL DEVICE (MAC ADDRESS FOR WIRELESS LAN) | SEX | AGE |
|---|---|---|---|
| FATHER | XX:XX:XX:XX:XX:A1 | MALE | 40 |
| MOTHER | XX:XX:XX:XX:XX:A2 | FEMALE | 38 |
| BROTHER | XX:XX:XX:XX:XX:A3 | MALE | 15 |
| SISTER | XX:XX:XX:XX:XX:A4 | FEMALE | 8 |

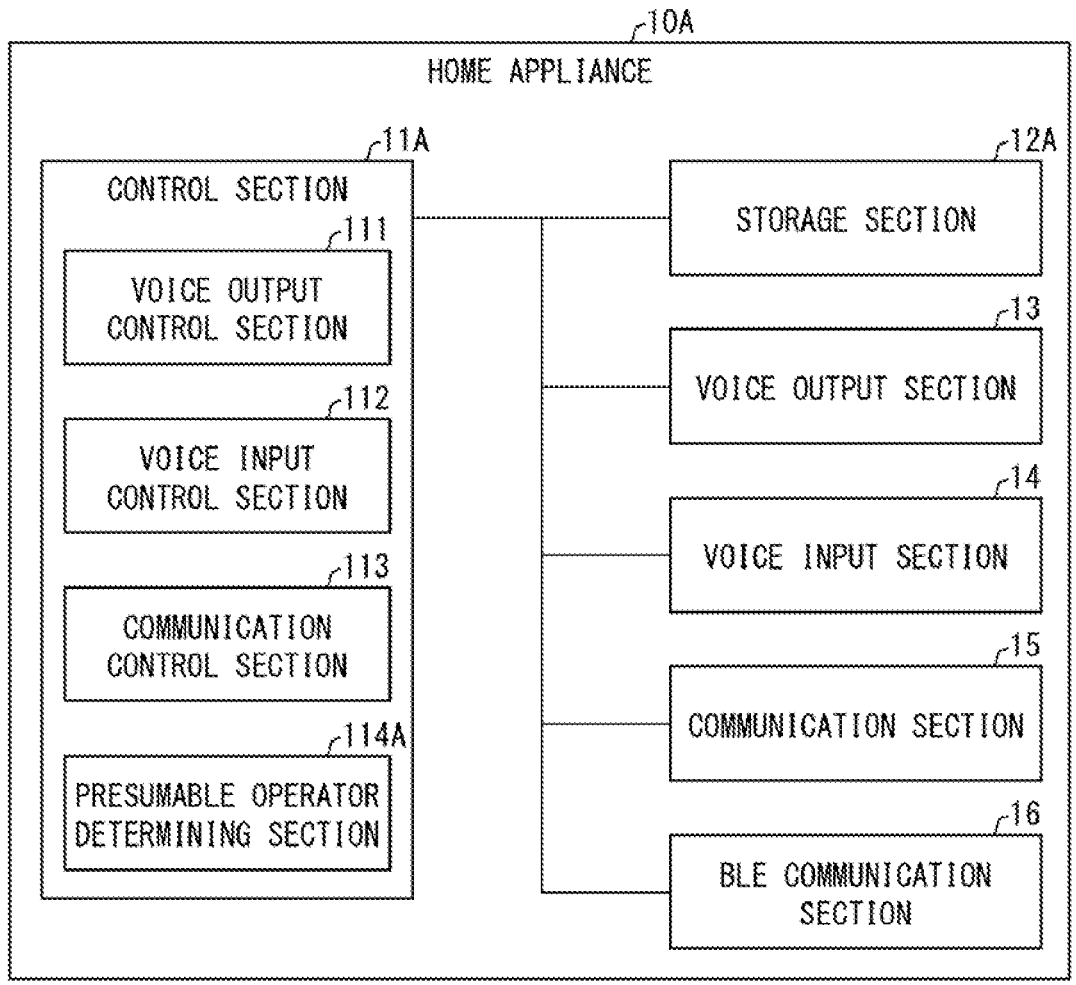

FIG. 11

| USER | UNIQUE INFORMATION OF COMMUNICATION TERMINAL DEVICE | | SEX | AGE |
|---|---|---|---|---|
| | MAC ADDRESS FOR WIRELESS LAN | MAC ADDRESS FOR BLE | | |
| FATHER | XX:XX:XX:XX:XX:C1 | XX:XX:XX:XX:XX:D1 | MALE | 40 |
| MOTHER | XX:XX:XX:XX:XX:C2 | XX:XX:XX:XX:XX:D2 | FEMALE | 38 |
| BROTHER | XX:XX:XX:XX:XX:C3 | | MALE | 15 |
| OLDER SISTER | XX:XX:XX:XX:XX:C4 | | FEMALE | 14 |
| YOUNGER SISTER | | XX:XX:XX:XX:XX:D3 | FEMALE | 8 |

OPERATOR ASSESSMENT SYSTEM

TECHNICAL FIELD

The present invention relates to a presumable operator determining system which determines a presumable operator who has operated, in a house, an electrical apparatus provided in the house.

BACKGROUND ART

So-called "home appliances", which are electrical apparatuses provided in a house and exemplified by a refrigerator, a heat cooking device, and the like, are increasingly becoming IoT (Internet of Things)-based. According to such IoT-based home appliances, for example, a user who has gone out can check information on foods in a refrigerator by remote control, or give the user's message to a member of the user's family via the refrigerator. In another example, a user can consult a refrigerator or a cooking device about a menu by voice control and receive a proposal of recipe information from a server.

There also exists a home appliance which has a voice output function and, in a case where an event (e.g., opening of a door of the home appliance, pressing of a button on the home appliance, an operation of the home appliance by voice control, or the like) occurs, outputs a voice in accordance with the event. Such a home appliance, when connected to a server, can obtain a wide variety of voice information from the server.

The applicant of the present application also has proposed, in Patent Literature 1, an electrical apparatus such as a refrigerator which allows a user who has gone out to convey a message more reliably to a member of the user's family in the house.

Meanwhile, there has been a technique of identifying a position of an individual in a house and automatically causing an electrical apparatus. For example, Patent Literature 2 discloses a technique in which a position of an individual is identified with use of a human sensor, which is provided in each room of a house, and a card for recognizing the individual, and an electrical apparatus is automatically controlled.

CITATION LIST

Patent Literature

[Patent Literature 1]
Japanese Patent Application Publication, Tokukai, No. 2015-225258 A
[Patent Literature 2]
Japanese Patent Application Publication, Tokukai, No. 2006-67417 A

SUMMARY OF INVENTION

Technical Problem

However, conventional home appliances, including the electrical apparatus of Patent Literature 1, involve neither (i) determining a presumable operator who has operated a door or a button of the home appliance nor (ii) determining a presumable operator who has consulted the home appliance about a menu by voice control.

Accordingly, content which is outputted as voice audio by the home appliance in response to an operation of the door or the button is undesirably general and regardless of generation and sex. Thus, it is not possible to provide a service that is suitable for each user. Further, in a case where (i) the home appliance is about to output a sound of a message in response to an operation of the door or the button and (ii) a family member (e.g., a father) other than another family member (e.g., a child) to whom the message is supposed to be directed operates the door or the button, the home appliance cannot avoid outputting the sound. This creates a confusing situation.

Further, in the case where a user consults a refrigerator or a cooking device about a menu, the refrigerator or the cooking device proposes the same menu in a case where a father consults and in a case where a mother consults. Thus, it is not possible to provide an interesting proposal such as "a special menu for a father to cook on a holiday".

Note that it is possible, by applying the technique disclosed in Patent Literature 2 of identifying a position of an individual in a house, so as to identify a user who has operated a door or a button of a home appliance and a user who has consulted the home appliance about a menu. In such a case, however, it is necessary to provide a human sensor in each room as well as providing each individual with a card for recognizing the individual. This results in a cost increase.

The present invention is accomplished in view of the foregoing problem. An object of the present invention is to provide a presumable operator determining system which allows determining, at minimum cost, a presumable operator who has operated an electrical apparatus.

Solution to Problem

In order to attain the object, a presumable operator determining system in accordance with one aspect of the present invention is a presumable operator determining system which determines a presumable operator who is presumably an operator who has operated an electrical apparatus provided in a house, including: a storage section storing therein unique information of respective communication terminal devices such that the unique information are respectively associated with users who operate the electrical apparatus, the communication terminal devices being respectively carried by the users and brought along by the users when the users go out; and a presumable operator determining section configured to, in a case where the electrical apparatus is operated, (i) conduct a search, with use of a communication section included in the electrical apparatus, for a communication terminal device which is present in the house among the communication terminal devices whose unique information are stored in the storage section and (ii) determine a presumable operator who is presumably an operator who has operated the electrical apparatus from among a user(s) associated with at least one terminal device detected through the search.

Advantageous Effects of Invention

The presumable operator determining system in accordance with one aspect of the present invention allows determining, at minimum cost, a presumable operator who has operated an electrical apparatus. Accordingly, the presumable operator determining system, when applied to an electrical apparatus which is IoT-based, allows providing, at minimum cost, a service suitable for each user who has operated the electrical apparatus.

BRIEF DESCRIPTION OF DRAWINGS

FIG. 7 is a block diagram schematically illustrating a configuration of a home appliance of the presumable operator determining system of FIG. 6.

FIG. 8 is a view illustrating an example of an information table which is stored in a storage section of the home appliance of the presumable operator determining system of FIG. 6 and in which information used for determining a presumable operator is registered.

FIG. 11 is a view illustrating an example of an information table which is stored in a storage section of a home appliance of the presumable operator determining system of FIG. 10 and in which information used for determining a presumable operator is registered.

DESCRIPTION OF EMBODIMENTS

Embodiment 1

The following description will discuss Embodiment 1 of the present invention with reference to FIGS. 1 through 5.

Figure 1:
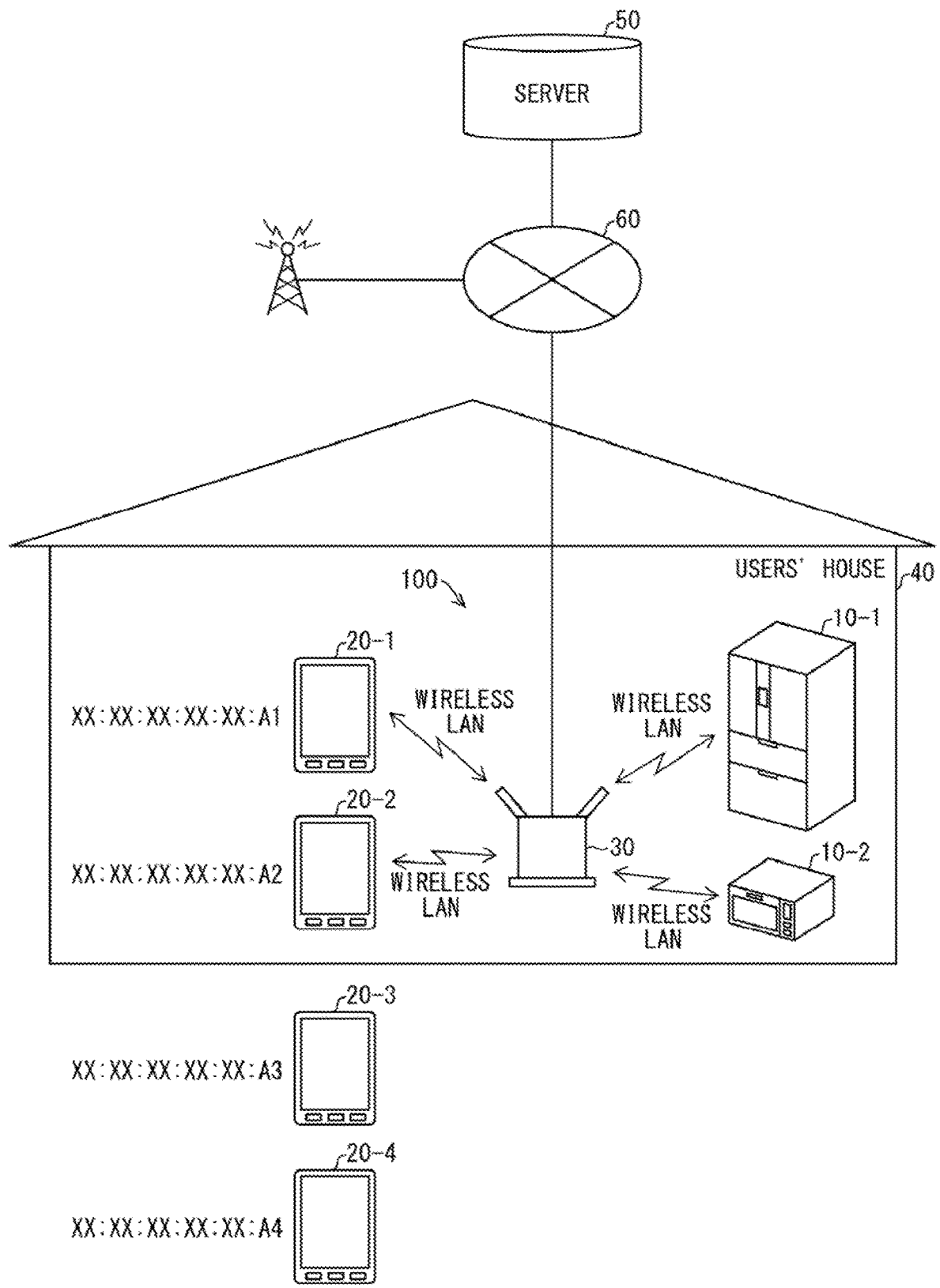
FIG. 1 is a conceptual view schematically illustrating a configuration of a presumable operator determining system in accordance with an embodiment of the present invention.

FIG. 1 is a conceptual view schematically illustrating a configuration of a presumable operator determining system 100 in accordance with Embodiment 1. As illustrated in FIG. 1, the presumable operator determining system 100 includes (i) a refrigerator 10-1 and a cooking device 10-2, each of which is a home appliance (electrical apparatus) 10 provided in a house 40 and (ii) communication terminal devices 20-1 through 20-4, which belong to respective users who operate the refrigerator 10-1 and the cooking device 10-2. In the example illustrated in FIG. 1, the users of the respective communication terminal devices 20-3 and 20-4 have gone out, and the communication terminal devices 20-3 and 20-4 are not present in the house 40.

Note that examples of the home appliances 10 include not only the refrigerator 10-1 and the cooking device 10-2 but also an air conditioner, a washing machine, an AV (Audio-Visual) device, a food preparation device (a microwave, a rice cooker, an electric kettle, or the like), an illumination device, a water heater, a photographing device, and a home robot (e.g., a cleaning robot, a housework-assisting robot, or a zoomorphic robot). Note that the description below uses the collective terms "home appliance 10" and "communication terminal device 20" in a case where there is no need to describe the above-described devices individually.

Inside the house 40, for example, a wireless LAN (Wireless Local Area Network), which is a localized communication network, is established (provided). The home appliances 10 and the communication terminal devices 20-1 and 20-2 which are carried by the users who are inside the house 40 are connected to a relay station 30 for the wireless LAN. The relay station 30 is, for example, a communication device such as a WiFi (registered trademark) router or a WiFi (registered trademark) access point. A communication range of the localized communication network is limited to a localized area (e.g., inside the house).

The home appliances 10 are so-called network home appliances which are connected to a wide area communication network 60 via the relay station 30. Note that a communication function part of each home appliance 10 may be retrofit to the home appliance 10 as a home appliance adaptor (not illustrated).

A server 50 is connected to the wide area communication network 60, and a correspondence relationship between the communication terminal devices 20 and the home appliances 10 is registered in the server 50. Since a combination of the communication terminal devices 20 and the home appliances 10 is thus registered in the server 50, the users of the communication terminal devices 20 are able to operate the home appliances 10 by remote control from the communication terminal devices 20 via the server 50.

Further, the home appliances 10 each have a function of accepting an operation carried out by a user with use of the user's voice (voice control). For example, in a case where a home appliance 10 is consulted by a user about a menu by voice control, the home appliance 10 can obtain recipe information from the server 50 and provide the recipe information to the user.

Further, the home appliances 10 each have a function of outputting a voice in a case where an event (e.g., opening of a door of the home appliance 10, pressing of a button on the home appliance 10, or an operation of the home appliance 10 by voice control) occurs. Examples of the voice outputted include a message which has been registered by a user from the communication terminal device 20 via the server 50.

The home appliances 10 can each obtain information of various kinds from the server 50, such as voice information, music information, and recipe information. Further, by being connected to the server 50, the home appliances 10 can perform voice recognition by utilizing a function of the server 50, instead of having their own voice recognition function etc. necessary for voice control.

The communication terminal devices 20 are communication terminal devices which are carried by respective users who are to be operators of the home appliances 10, and are brought along by the users when the users go out. The communication terminal devices 20 are communication terminal devices having a wireless LAN function, such as a smartphone and a mobile phone.

Connection between each of the communication terminal devices 20 and the Internet of the wide area communication network 60 is made with use of 3G (3rd Generation), LTE (Long Term Evolution), a WiFi (registered trademark)

access point in a house or a public space. Note that apart from the configuration in which the wide area communication network 60 includes the Internet, it is possible to employ a configuration in which the wide area communication network 60 utilizes a telephone network, a movable body communication network, a CATV (CAble TeleVision) communication network, a satellite communication network, or the like.

In the presumable operator determining system 100, unique information of a communication terminal device 20 of each user who operates the home appliances 10 is registered so as to be associated with the each user. In a case where a home appliance 10 is operated by a user, the home appliance 10 conducts a search, with use of a communication section 15 (see FIG. 2) (described later) included in the home appliance 10, for a communication terminal device 20 that is connected to the relay station 30, among the communication terminal devices 20 whose unique information have been registered. Then, the home appliance 10 determines the user(s), who is/are associated with communication terminal device(s) 20 detected through the search, to be a presumable operator(s). Hereinafter, a communication terminal device 20 whose unique information is registered will be referred to as a registered communication terminal device 20.

It is becoming common these days that each family member has a communication terminal device 20 such as a smartphone or a mobile phone and changes an Internet environment from LTE or the like to a WiFi (registered trademark) access point connection when the family member uses the communication terminal device 20 in the house 40.

The applicant of the present application paid attention to this point, and designed a configuration in which, in a case where a home appliance 10 is operated and thus an event occurs, the home appliance 10 conducts a search for a registered communication terminal device 20 that is present inside the house 40 (i.e., a registered communication terminal device 20 which is connected to the relay station 30). Then, from among the users of registered communication terminal devices 20 detected through the search, the home appliance 10 determines a user who is a presumable operator who has operated the home appliance 10.

In a case where only a single registered communication terminal device 20 is present in the house 40, it is possible to narrow possible operators down to a single operator (specify a single operator). However, in a case where a plurality of registered communication terminal devices 20 are present in the house 40, it is not possible to narrow down to a single operator. In such a case, it is only possible to determine that an operator is presumably included among the users who correspond to the plurality of registered communication terminal devices 20.

As such, in the case where the plurality of registered communication terminal devices 20 are present in the house 40, it is preferable to narrow down the plurality of users corresponding to the plurality of registered communication terminal devices 20, for determining a user who is a presumable operator.

In Embodiment 1, with respect to a plurality of registered communication terminal devices 20 which are present in the house 40, the users associated with the respective plurality of registered communication terminal devices 20 are narrowed down, for determining a user who is a presumable operator, on the basis of identification information which can be used for identification of the users associated with the plurality of registered communication terminal devices 20.

In this example, a result of "sex recognition" and/or "generation recognition", which is obtained through voice recognition of an operator's voice, is used as the identification information.

Figures 2, 3:
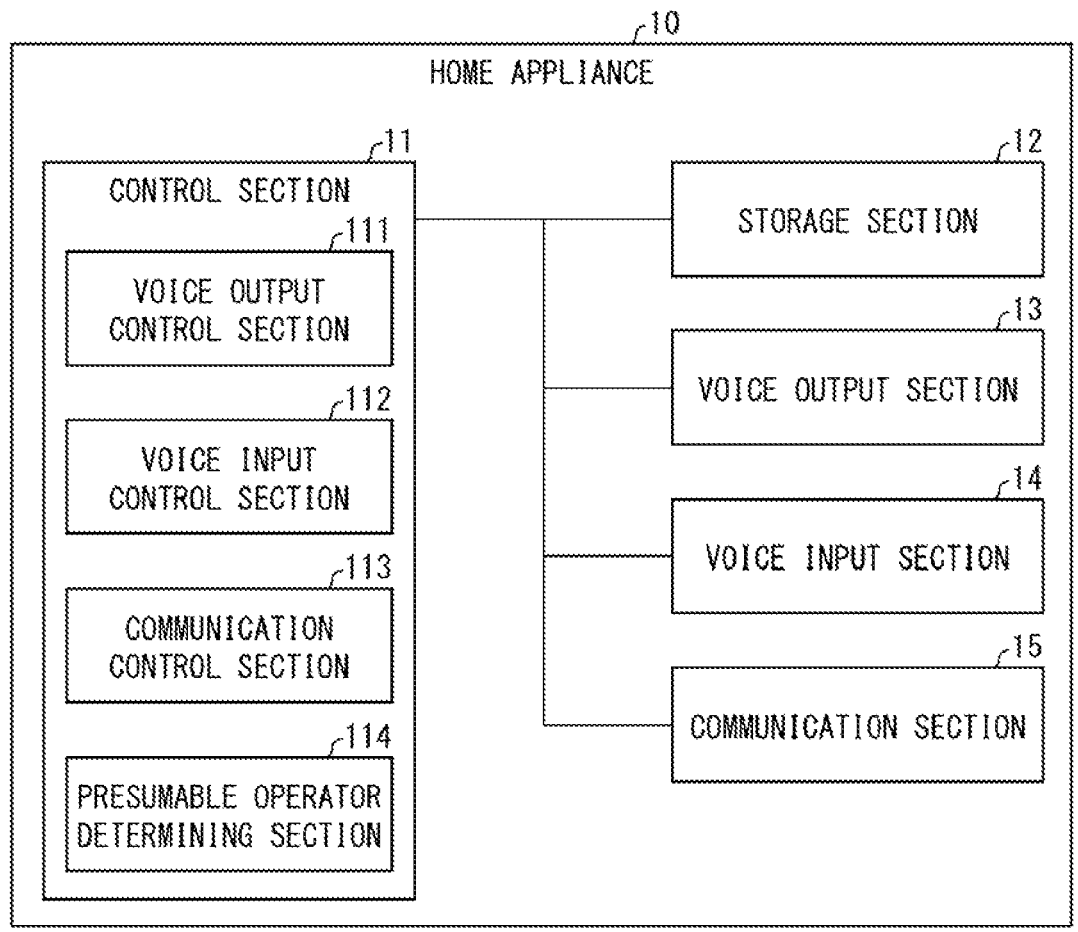
FIG. 2 is a block diagram schematically illustrating a configuration of a home appliance of the presumable operator determining system.
FIG. 3 is a view illustrating an example of an information table which is stored in a storage section of the home appliance of the presumable operator determining system and in which information used for determining a presumable operator is registered.

FIG. 2 is a block diagram schematically illustrating a configuration of each home appliance 10 of the presumable operator determining system 100. As illustrated in FIG. 2, the home appliance 10 includes a control section 11, a storage section 12, a voice output section 13, a voice input section 14, and a communication section 15. Note that in FIG. 2, blocks of original functions of the home appliance 10 as a home appliance itself are omitted. For example, in a case where the home appliance 10 is the refrigerator 10-1, the home appliance 10 includes a block of a cooling function, whereas in a case where the home appliance 10 is the cooking device 10-2, the home appliance 10 includes a block of a food preparing function.

The control section 11 is constituted by, for example, a computer device which includes an arithmetic processing section such as a CPU (Central Processing Unit) or a dedicated processor. The control section 11 controls an operation of each section of the home appliance 10. The control section 11 includes a voice output control section 111, a voice input control section 112, a communication control section 113, and a presumable operator determining section 114 (described later).

The storage section 12 stores therein various information used by the home appliance 10. The storage section 12 also stores therein data such as voice information, music information, and recipe information obtained from the server 50. Further, the storage section 12 also stores therein (i) unique information (described later) of a communication terminal device 20 of each user who operates the home appliance 10 and (ii) information (described later) of the "sex", "age", etc. of the user, the pieces of information (i) and (ii) being necessary for determining a presumable operator of the home appliance 10. A communication terminal device 20 whose unique information is stored in the storage section is a registered communication terminal device 20.

The voice output section 13 is a voice output device such as a speaker. The voice input section 14 is a voice input device such as a microphone.

The communication section 15 communicates with the server 50 via the relay station 30 of a localized communication network and the wide area communication network 60. Further, the communication section 15 can communicate with the communication terminal devices 20 via the relay station 30 without involvement of the wide area communication network (the communication section 15 can communicate not only with a registered communication terminal device 20 but also any communication terminal device 20 which can connect to the relay station 30).

The voice output control section 111 controls the voice output section 13. In a case where an operation such as opening a door of the home appliance 10 or pressing a button of the home appliance 10 is performed and the control section 11 detects occurrence of the event, the voice output control section 111 instructs the voice output section 13 to output a voice. Voice data on which the voice outputted is based is stored in the storage section 12.

The voice input control section 112 controls the voice input section 14. In Embodiment 1, the voice input control section 112 sends, to the communication section 15, voice data of a voice inputted from the voice input section 14, and the communication section 15 transmits the voice data to the server 50.

The server 50 performs voice recognition with respect to the voice data received from the home appliance 10. In a case where the voice recognition reveals that the voice data contains content that is intended to instruct an operation, the server 50 transmits, to the home appliance 10, a command which instructs the operation to be performed, and the communication section 15 of the home appliance 10 receives the command. Further, the server 50 also carries out "sex recognition" and "generation recognition" in the voice recognition, and transmits recognized results to the home appliance 10. The communication section 15 of the home appliance 10 receives the recognized results.

The communication control section 113 controls the communication section 15. In a case where the communication section 15 receives a command from the server 50, the communication control section 113 sends the command received to the control section 11. Examples of the command received from the server 50 include a command which is given through voice control and a command which is given through remote control from a communication terminal device 20 via the relay station 30 and the wide area communication network 60.

Further, the communication control section 113 sends, to the presumable operator determining section 114, recognized results of "sex recognition" and "generation recognition" which the communication section 15 has received from the server 50. Further, in a case where the communication section 15 has received voice data from the server 50, the communication control section 113 stores the voice data in the storage section 12.

In a case where an operation (e.g., opening of a door of the home appliance 10, pressing of a button of the home appliance 10, an operation of the home appliance 10 by voice control, or the like) is performed and thus an event occurs, the presumable operator determining section 114 uses the communication section 15 so as to conduct a search for a registered communication terminal device 20 which can be determined as presumably being present in the house 40. Then, the presumable operator determining section 114 determines a presumable operator who has performed the operation from among the users of registered communication terminal devices 20 detected through the search. The presumable operator determining section 114 determines that a registered communication terminal device 20 that is connected to the relay station 30 of the localized communication network is presumably present in the house 40. Note here that the above expression "a registered communication terminal device 20 which can be determined as presumably being present in the house 40" is used because even in a case where a registered communication terminal device 20 is located outside the house 40 (e.g., located in a yard), it is determined, as long as the registered communication terminal device 20 is connected to the wireless LAN, that the registered communication terminal device 20 is present in the house 40. For easy explanation, "a registered communication terminal device 20 which can be determined as presumably being present in the house 40" will hereinafter be referred to as "a registered communication terminal device 20 which is present in the house 40".

In the storage section 12, as unique information which allows identifying the communication terminal device 20 of each user who can be an operator of the home appliance 10, for example, a MAC address which is allocated to the wireless LAN is pre-registered. FIG. 3 is a view illustrating an example of an information table which is stored in the storage section and in which information used for determining a presumable operator is registered. The example of FIG. 3 represents a case in which users who are to be operators are four members of a family, namely, parents, a brother, and a sister.

As illustrated in FIG. 3, as unique information allowing communication terminal devices 20 to be identified, MAC addresses (XX:XX:XX:XX:XX:A1, XX:XX:XX:XX:XX:A2, XX:XX:XX:XX:XX:A3, and XX:XX:XX:XX:XX:A4) of the communication terminal devices 20-1 through 20-4 of the respective users "father", "mother", "brother", and "sister" are registered so as to be associated with the respective users. Further, in Embodiment 1, in order to narrow down registered communication terminal devices 20 with use of results of "sex recognition" and "generation recognition" obtained through voice recognition, information of the "sex" and "age" of each user is also registered as user information which can be used for identifying the user.

In a case where an event occurs, the presumable operator determining section 114 conducts a search for a registered communication terminal device 20 connected to the relay station 30, as a registered communication terminal device 20 which is present in the house 40. Specifically, with respect to each of all the users included in the information table of the family, the presumable operator determining section 114 finds an IP address of a corresponding registered communication terminal device 20 from a MAC address thereof with use of arp-a or the like, and repeatedly checks, by Ping or the like, whether or not the registered communication terminal device 20 is present. Thus, the presumable operator determining section 114 narrows down the registered communication terminal devices 20 to those whose presence has been confirmed, as registered communication terminal devices 20 which are present in the house 40.

In a case where a single registered communication terminal device 20 is present in the house 40, the presumable operator determining section 114 identifies the user of the single registered communication terminal device 20 as the operator who has operated the home appliance 10. Meanwhile, in a case where a plurality of registered communication terminal devices 20 are present in the house 40, the presumable operator determining section 114 performs further narrowing down with use of a result of the voice recognition function. Specifically, the presumable operator determining section 114 refers to the information table so as to compare the "sex recognition" and "generation recognition" identification information, which is results of voice recognition and has been received from the server 50, with the user information "sex" and "age" of each of the users associated with the respective plurality of registered communication terminal devices 20 detected. Through the comparison, the presumable operator determining section 114 determines that a user of a registered communication terminal device 20 which user matches the "sex recognition" and "generation recognition" identification information is presumably the operator who has operated the home appliance 10. In a case where a plurality of registered communication terminal devices 20 match the "sex recognition" and "generation recognition" identification information, the registered communication terminal device 20 determines that any one of the users corresponding to the plurality of registered communication terminal devices 20 is presumably the operator who has operated the home appliance 10. Meanwhile, in a case where the comparison successfully allows narrowing down to a single registered communication terminal device 20, the registered communication terminal device 20 identifies the user of the single registered communication terminal device 20 as the operator who has operated the home appliance 10.

Further, in Embodiment 1, in a case where an operation which has caused an event is not voice control but is opening and closing of a door or pressing of a button, the presumable operator determining section 114 instructs the voice output control section 111 to output a calling voice which encourages the operator to speak. This is done in order to perform narrowing down with use of results of voice recognition. Content conveyed by the calling voice can be, for example, in a form of an interrogative sentence (e.g., "Did you just opened the door?" or "You pressed the button didn't you?") which induces an answer from the operator.

The presumable operator determining section 114 instructs the voice input control section 112 and the communication section 15 so as to transmit, to the server 50, voice data of the operator which voice data has been obtained through the voice input control section 112 as an answer to the calling. The presumable operator determining section 114 receives results of "sex recognition" and "generation recognition" from the server 50, and carries out narrowing down with use of these results of voice recognition.

Figure 4:
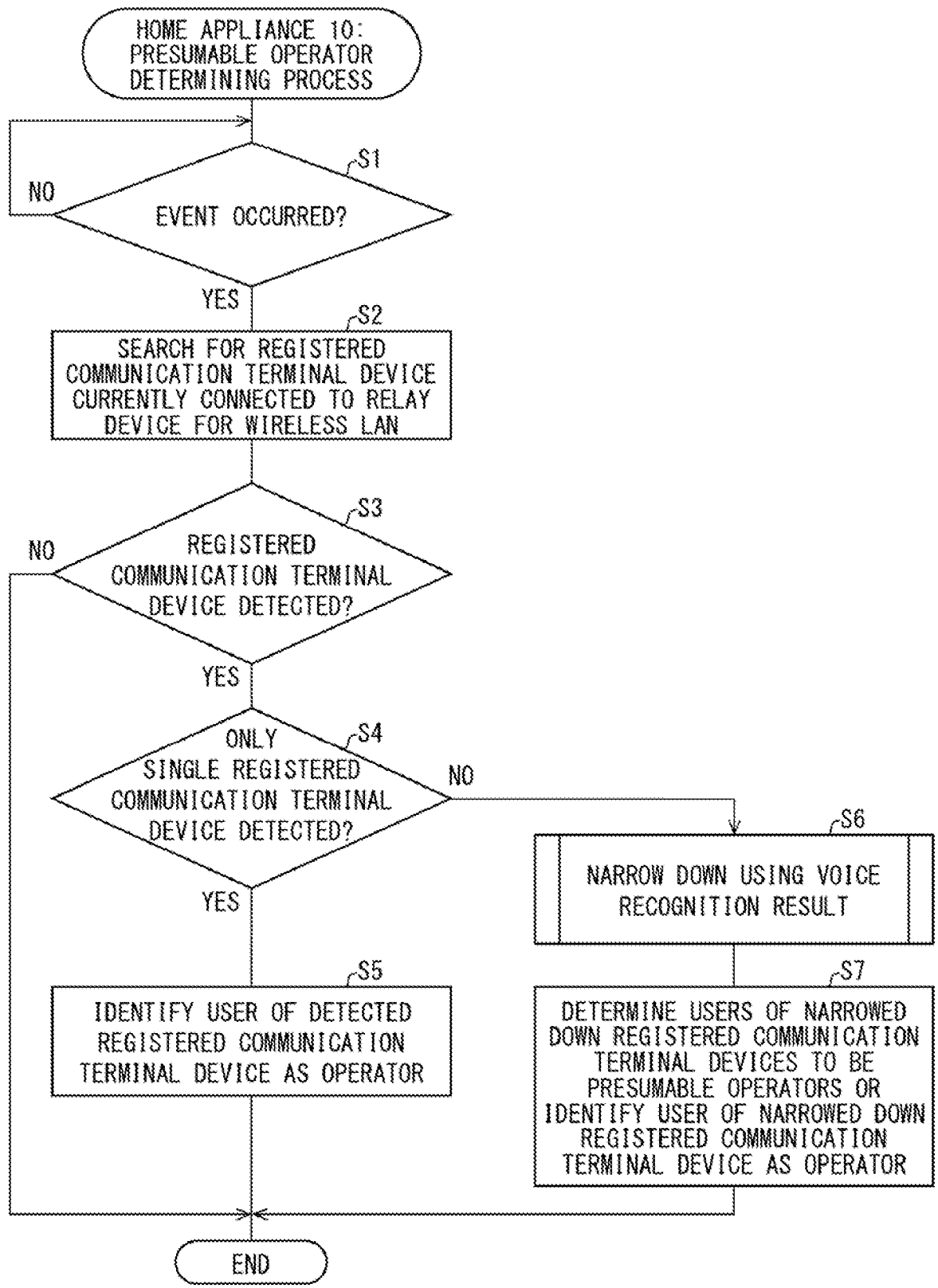
FIG. 4 is a flowchart of a presumable operator determining process carried out by the home appliance of the presumable operator determining system.

FIG. 4 is a flowchart of a presumable operator determining process carried out by the home appliance 10. The control section 11 of the home appliance 10 is always performing detection of whether or not an event has occurred (S1). In a case where an event occurs and the control section 11 thus determines YES at S1, the control section 11 conducts a search for a registered communication terminal device 20 connected to the relay station 30 (S2). Subsequently, the control section 11 determines whether or not a registered communication terminal device 20 connected to the relay station 30 has been successfully detected (S3). In a case where the control section 11 determines NO (no registered communication terminal device 20 was successfully detected), the control section 11 ends the process.

Meanwhile, in a case where a registered communication terminal device(s) 20 connected to the relay station 30 is/are successfully detected and the control section 11 thus determines YES at S3, the control section 11 subsequently determines whether or not only a single registered communication terminal device 20 has been detected (S4). In a case where the control section 11 determines YES at S4, the control section 11 identifies the user of the single registered communication terminal device 20 detected as the operator (S5). Meanwhile, in a case where a plurality of registered communication terminal devices 20 have been detected and the control section 11 determines NO at S4, the control section 11 performs narrowing down with use of results of voice recognition (S6), and determines that a user(s) remaining as a result of the narrowing down at S6 is/are a presumable operator(s). In a case where a single user remains as a result of the narrowing down, the control section 11 identifies the single user as the operator (S7).

Note that in a case where (i) the process proceeds to S6 and (ii) the users of the plurality of registered communication terminal devices 20 detected are of the same sex and in the same age group, it is not possible to narrow down the users to a single user. However, this is not particularly problematic, since a service to be provided (e.g., speech content, music, or the like) is basically the same among users who are of the same sex and in the same age group.

Figure 5:
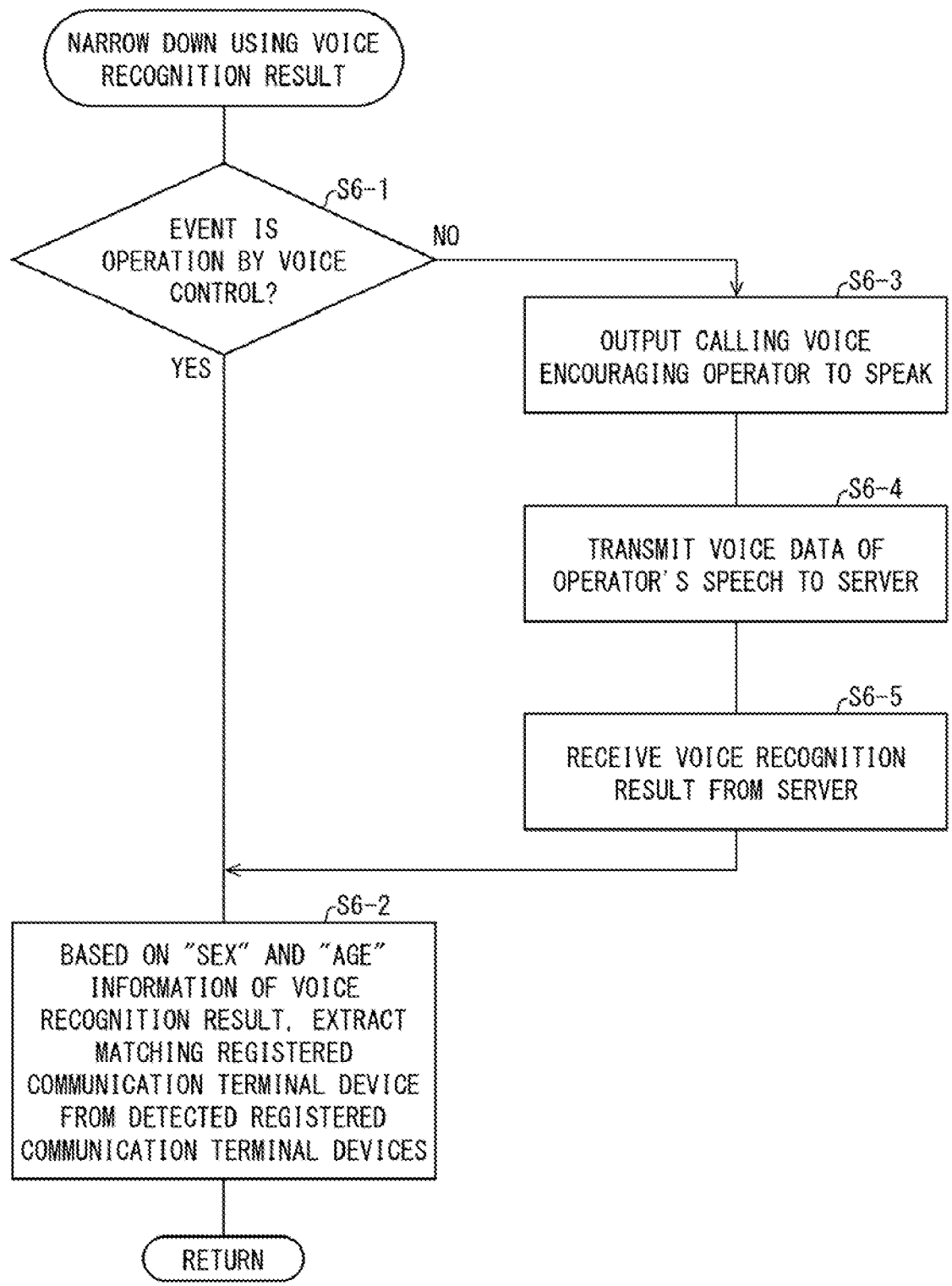
FIG. 5 is a flowchart of a narrowing down process, which uses results of voice recognition, at S6 in the flowchart of FIG. 4.

FIG. 5 is a flowchart of the narrowing down process, which uses results of voice recognition, at S6 in the flowchart of FIG. 4. The control section 11 of the home appliance 10 determines whether or not the event, which was determined to have occurred by the control section 11 at S1 in the flowchart of FIG. 4, is voice control (S6-1). In a case where the event is voice control and the control section 11 thus determines YES at S6-1, the control section 11 extracts, on the basis of the information of the results of "sex recognition" and "generation recognition" which have been received from the server 50 as results of voice recognition, a registered communication terminal device(s) 20 that match (es) the information of the results of "sex recognition" and "generation recognition" from among the plurality of registered communication terminal devices 20 which were detected at S2 in the flowchart of FIG. 4 (S6-2). Then, the control section 11 proceeds to S7 in the flowchart of FIG. 4.

Meanwhile, in a case where the event is an operation other than voice control and the control section 11 determines NO at S6-1, the control section 11 outputs a calling voice which encourages the operator to speak (S6-3). Then, the control section 11 transmits, to the server 50, voice data of the operator's answer to the calling voice (S6-4), and receives results of "sex recognition" and "generation recognition" from the server 50 as results of voice recognition (S6-5). Subsequently, the control section 11 proceeds to S6-2, and extracts a registered communication terminal device(s) 20 that match(es) the results of "sex recognition" and "generation recognition" from among the plurality of registered communication terminal devices 20 which were detected at S2 in the flowchart of FIG. 4.

As illustrated in FIG. 1, in a case where the "father" and the "mother", who are the users of the respective registered communication terminal devices 20-1 and 20-2, are in the house 40, determination in terms of connection to the relay station 30 does not allow determining whether the operator who has operated the home appliance 10 is the "father" or the "mother". However, since the determination does allow excluding the two users of the "brother" and the "sister" from possible operators, it is possible to avoid a situation where a sound of a message for the "brother" or the "sister" is outputted to the "father" or the "mother". It is also possible to output content for the "father" or the "mother" as voice audio.

Further, by performing narrowing down with use of a result of voice recognition (narrowing on the basis of sex) in addition to the determination in terms of connection to the relay station 30, it is possible to determine which one of the "father" and the "mother", who are in the house 40, is the operator. Similarly, in a case where the "father" and the "brother" are in the house 40, performing narrowing down with use of a result of voice recognition (narrowing down on the basis of age) in addition to the determination in terms of connection to the relay station 30 allows determining which one of the "father" and the "brother", who are in the house 40, is the operator.

As described above, in the presumable operator determining system 100 in accordance with Embodiment 1, attention is paid to communication terminal devices 20, such as a smartphone and a mobile phone, which are (i) carried by respective users who are to be operators of the home appliance 10, (ii) carried by the respective users when the users go out, and (iii), in the house 40, connected to the relay station 30 of the localized communication network so as to be used by the users. Through the attention paid, the presumable operator determining system 100 is designed such that communication terminal devices 20 of users who are to be operators of the home appliance 10 are pre-registered (registered communication terminal devices 20), and in a case of occurrence of an event, it is determined that the user(s) of a registered communication terminal device(s) 20 connected to the relay station 30 is/are inside the house 40 and thus is/are a possible operator(s). Then, in a case where a single registered communication terminal device 20 is connected to the relay station 30, the user of the single registered communication terminal device 20 is identified as the operator. In a case where a plurality of registered communication terminal devices 20 are connected to the relay station 30, further narrowing down is performed with use of user information and identification information. In a case where a single registered communication terminal device 20 remains as a result of the narrowing down, the user of the single registered communication terminal device 20 is similarly identified as the operator of the home appliance 10.

Accordingly, it is possible to determine, at minimum cost, a presumable operator who has operated a door or a button of the home appliance 10 or operated the home appliance 10 by voice control. As a result, when applied to, for example, a home appliance which is IoT-based, the presumable operator determining system 100 allows providing, at minimum cost, a service suitable for each user who has operated the home appliance.

Embodiment 2

The following description will discuss Embodiment 2 of the present invention with reference to FIGS. 6 through 9. For easy explanation, the same reference signs will be given to members having the same function as a member described in Embodiment 1, and descriptions on such a member will be omitted.

In a presumable operator determining system in accordance with Embodiment 2, communication terminal devices having a BLE (Bluetooth (registered trademark) Low Energy) function are used as communication terminal devices which are carried by respective users who operate a home appliance, and are brought along by the users when the users go out. Examples of the communication terminal device having a BLE function include: a smartphone having a BLE function; a wearable terminal which has a BLE function and is in a form of a garment or a watch and thus usable while being worn by a user; and the like.

Figure 6:
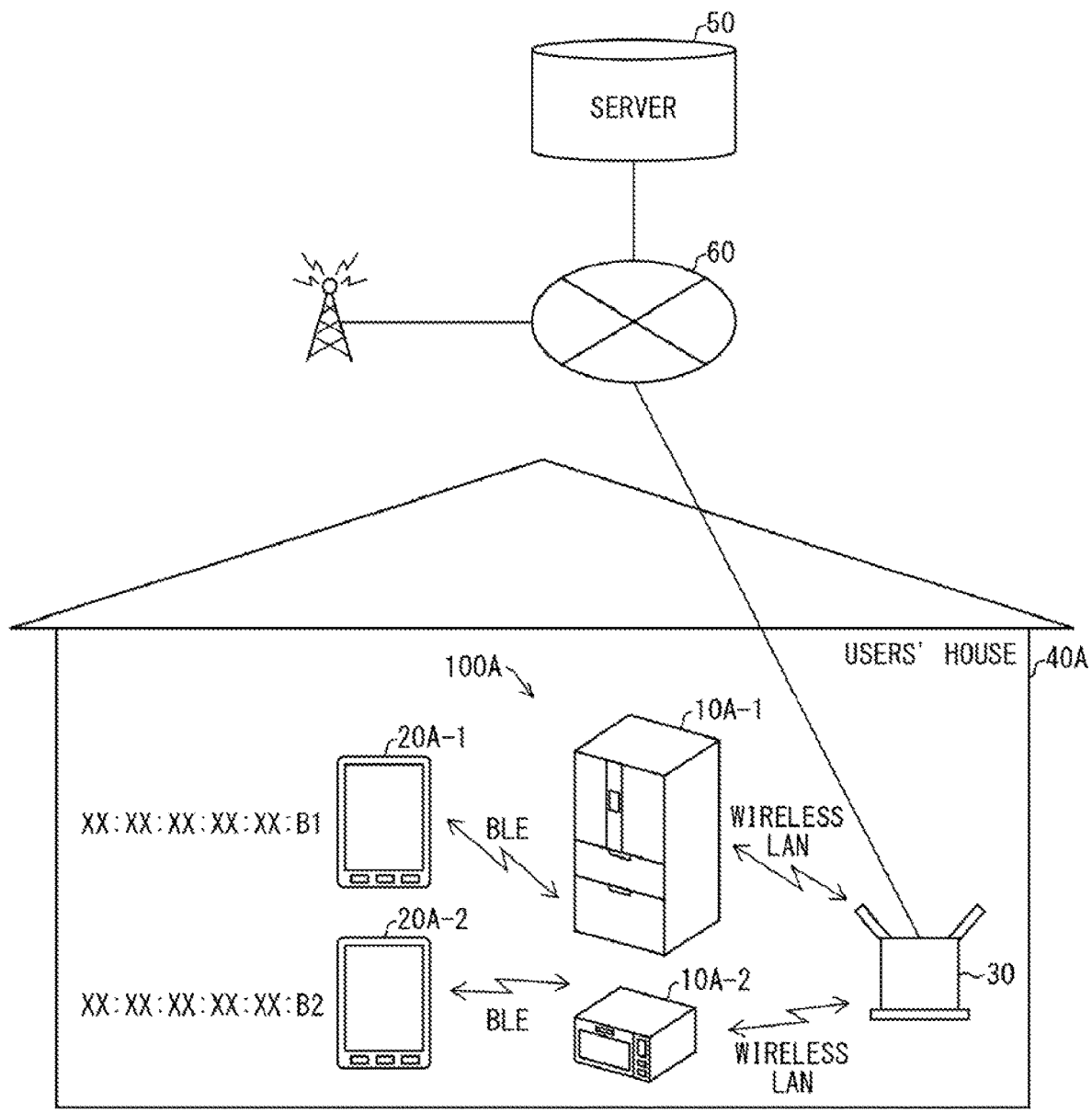
FIG. 6 is a conceptual view schematically illustrating a configuration of a presumable operator determining system in accordance another embodiment of the present invention.

FIG. 6 is a conceptual view schematically illustrating a configuration of a presumable operator determining system 100A in accordance with Embodiment 2. As illustrated in FIG. 6, the presumable operator determining system 100A includes (i) a refrigerator 10A-1 and a cooking device 10A-2, each of which is a home appliance provided in a house 40A and (ii) communication terminal devices 20A-1 through 20A-4, which belong to respective users who may operate the refrigerator 10A-1 and the cooking device 10A-2 and each of which has a BLE function. In the example illustrated in FIG. 6, the users of the respective communication terminal devices 20A-3 and 20A-4 have gone out, and the communication terminal devices 20A-3 and 20A-4 are not present in the house 40A. Note that the description below too uses the collective terms "home appliance 10A" and "communication terminal device 20A" in a case where there is no need to describe the above-described devices individually.

The home appliances 10A are so-called network home appliances which are connected to a wide area communication network 60 via a relay station 30. The home appliances 10A differ from the home appliances 10 in that each home appliance 10A further includes a BLE communication device. Note that the BLE communication device may be retrofit to each home appliance 10A as a home appliance adaptor (not illustrated).

BLE communications involve a small-sized communication device and achieve extremely low power consumption.

In a BLE communication, presence of another communication terminal device 20A and a radio field intensity of the communication can be detected without performing paring, and it is possible to determine a distance between BLE communication devices on the basis of the radio field intensity of the communication.

Each home appliance 10A, in a case where an event occurs, conducts a search, with use of the BLE communication device, for a presence of a communication terminal device 20A which is located at a distance from the home appliance 10A within which distance the communication terminal device 20A can communicate with the home appliance 10A. Specifically, the home appliance 10A conducts a search for a communication terminal device 20A which is present, for example, within 5 m (first predetermined distance) from the home appliance 10A (a distance of the communication terminal device 20A is determined in accordance with a radio field intensity of the communication). Note here that the first predetermined distance is set, for example, to "within 5 m" because a communication terminal device 20A which is present within 5 m from the home appliance 10A can be determined as presumably being in the house 40A. The first predetermined distance is by no means limited to 5 m. Further, the expression "a communication terminal device 20A which can be determined as presumably being in the house 40A" is used because in a case where a distance from the home appliance 10A to a communication terminal device 20A is, for example, not more than 5 m, it is determined that the communication terminal device 20A is present in the house 40A, even if the communication terminal device 20A is located outside the house 40A. In the following description, too, "a communication terminal device 20A which can be determined as presumably being in the house 40A" will be referred to, for easy explanation, as "a registered communication terminal device 20A which is present in the house 40".

As with Embodiment 1, unique information of the communication terminal device 20A carried by each user who operates the home appliance 10A is pre-registered so as to be associated with the each user. Hereinafter, a communication terminal device 20A whose unique information is registered will be referred to as a registered communication terminal device 20A.

In a case where presence of a registered communication terminal device 20A within the first predetermined distance from the home appliance 10A is detected by the BLE communication function, the home appliance 10A determines that the registered communication terminal device 20A is present in the house 40. Then, the home appliance 10A determines a presumable operator who has operated the home appliance 10A from among the users of the registered communication terminal devices 20A which are present in the house 40.

In a case where only a single registered communication terminal device 20A is present within the first predetermined distance from the home appliance 10A, it is possible to narrow down possible operators and specify a single operator. However, in a case where a plurality of registered communication terminal devices 20A are present in the house 40, possible operators are narrowed down on the basis of radio field intensity of communication. Then, in a case where only a single registered communication terminal device 20A has the highest radio field intensity, the user of the single registered communication terminal device 20A is identified as the operator. In a case where a plurality of registered communication terminal devices 20A have similarly high radio field intensities, further narrowing down is performed with use of a result of "sex recognition" and/or "generation recognition", as with Embodiment 1.

FIG. 7 is a block diagram schematically illustrating a configuration of each home appliance 10A of the presumable operator determining system 100A. As illustrated in FIG. 7, the home appliance 10A includes a control section 11A, a storage section 12A, a voice output section 13, a voice input section 14, a communication section 15, and a BLE communication section 16 which is a BLE communication device. The control section 11A includes a presumable operator determining section 114A in place of the presumable operator determining section 114. In the storage section 12A, an information table as illustrated in FIG. 8 is stored in place of the information table illustrated in FIG. 3.

In a case where an operation (e.g., opening of a door of the home appliance 10A, pressing of a button of the home appliance 10A, an operation of the home appliance 10A by voice control, or the like) is performed and thus an event occurs, the presumable operator determining section 114a uses the BLE communication section 16 so as to conduct a search for a registered communication terminal device 20A which is present within the first predetermined distance (e.g., within 5 m) from the home appliance 10A. Through the search, a communication terminal device 20A which is other than the registered communication terminal devices 20A whose unique information is stored in the storage section 12A is also detected.

The presumable operator determining section 114A refers to the storage section 12A so as to extract, from among a communication terminal device(s) 20A detected through the search, a registered communication terminal device(s) 20A with use of the unique information (in this case, MAC addresses) of the registered communication terminal devices 20A. Then, from among the users of the registered communication terminal device(s) 20A extracted, the presumable operator determining section 114A determines a presumable operator. Specifically, in a case where a single registered communication terminal device 20A is included among the communication terminal device(s) 20A detected, the presumable operator determining section 114A identifies the user of the single registered communication terminal device 20A as the operator who has operated the home appliance 10A. Meanwhile, in a case where a plurality of registered communication terminal devices 20A are included, the presumable operator determining section 114A performs narrowing down, so that, in a case where only a single registered communication terminal device 20A has the highest radio field intensity, the presumable operator determining section 114A identifies the user of the single registered communication terminal device 20A to be the operator who has operated the home appliance 10A. Alternatively, in a case where a plurality of registered communication terminal devices 20A have similarly high radio field intensities, the presumable operator determining section 114A performs further narrowing down with use of a result of the above-described voice recognition function, so that, in a case where a single registered communication terminal device 20A remains as result of the narrowing down, the presumable operator determining section 114A identifies the user of the single registered communication terminal device 20A as the operator. Note here that having similarly high radio field intensities means a case in which a plurality of registered communication terminal devices 20A have respective radio field intensities (i) which are identical to each other or (ii) which are all within a certain threshold range and can be considered to be on the same level.

In the storage section 12A, as unique information which allows identifying the communication terminal device 20A of each user who can be an operator of the home appliance 10A, for example, a MAC address which is allocated to BLE communications is pre-registered. FIG. 8 is a view illustrating an example of an information table which is stored in the storage section 12A and in which information used for determining a presumable operator is registered. The example of FIG. 8 represents a case in which users who are to be operators are four members of a family, namely, parents, a brother, and a sister.

As illustrated in FIG. 8, as unique information allowing communication terminal devices 20A to be identified, MAC addresses (XX:XX:XX:XX:XX:B1, XX:XX:XX:XX:XX:B2, XX:XX:XX:XX:XX:B3, and XX:XX:XX:XX:XX:B4) of the communication terminal devices 20A-1 through 20A-4 of the respective users "father", "mother", "brother", and "sister" are registered so as to be associated with the respective users. Note that, as with Embodiment 1, information of the "sex" and "age" of each user is also registered as user information which can be used for identifying the user.

Figure 9:
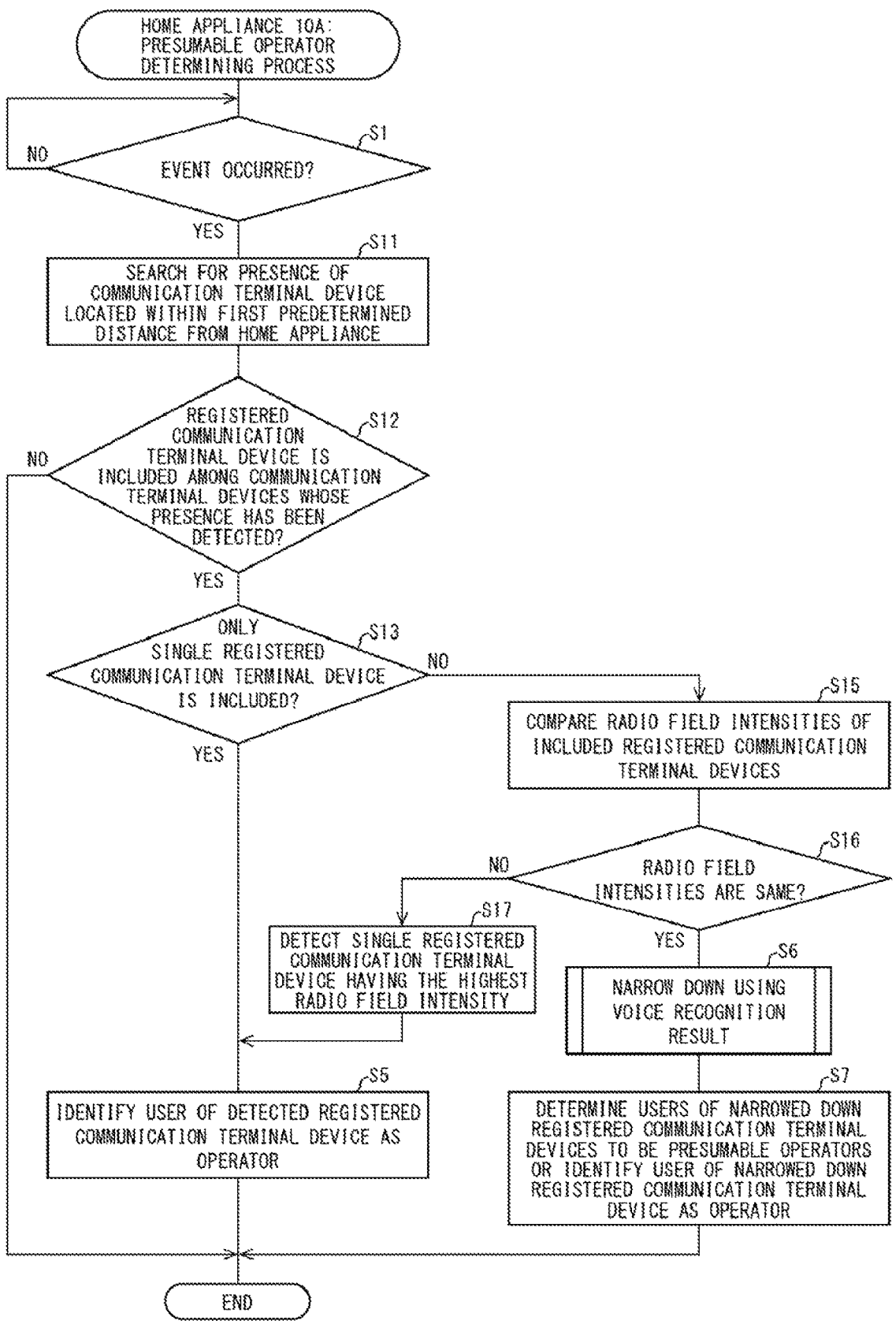
FIG. 9 is a flowchart of a presumable operator determining process carried out by the home appliance of the presumable operator determining system of FIG. 6.

FIG. 9 is a flowchart of a presumable operator determining process carried out by the home appliance 10A. The control section 11A of the home appliance 10A is always performing detection of whether or not an event has occurred (S1). In a case where an event occurs and the control section 11A thus determines YES at S1, the control section 11A conducts a search for a presence of a registered communication terminal device 20A which is located within the first predetermined distance from the home appliance 10A (S11). Subsequently, the control section 11 determines whether or not a registered communication terminal device 20A is included among a registered communication terminal device(s) 20A whose presence has been detected through the search (S12). In a case where the control section 11 determines NO (no registered communication terminal device 20A is included among the registered communication terminal device(s) 20A detected), the control section 11 ends the process.

Meanwhile, in a case where a registered communication terminal device(s) 20A is/are included among the registered communication terminal device(s) 20A detected and the control section 11A thus determines YES at S12, the control section 11 subsequently determines whether or not a single registered communication terminal device 20A is included among the registered communication terminal device(s) 20A detected (S13). In a case where the control section 11A determines YES at S13, the control section 11A identifies the user of the single registered communication terminal device 20, which is included among the registered communication terminal device(s) 20A detected, as the operator (S14).

Meanwhile, in a case where a plurality of registered communication terminal devices 20A are detected and the control section 11A thus determines NO at S13, the control section 11A proceeds to S15 and makes a comparison between the plurality of registered communication terminal devices 20A included, in terms of a radio field intensity of a communication between each registered communication terminal device 20A and the BLE communication section 16. Subsequently, the control section 11A determines whether or not the radio field intensities of the respective plurality of registered communication terminal devices 20A are identical to each other (S16), and in a case where the intensities are not identical and the control section 11A thus determines NO, the control section 11A detects a single registered communication terminal device 20A having the highest radio field intensity, and proceeds to S14. Meanwhile, in a case where the radio field intensities are identical to each other and the control section 11A thus determines YES at S16, the control section 11A proceeds to S6 and performs narrowing down with use of a result of voice recognition. Note that processes of S6 and S7 are the same as those of S6 and S7 in the flowchart of FIG. 4.

As described above, in the presumable operator determining system 100A in accordance with Embodiment 2, attention is paid to communication terminal devices 20A having a BLE communication function, as communication terminal devices which are (i) carried by respective users who are to be operators of the home appliance 10 and (ii) brought along by the users when the users go out. Through the attention paid, the presumable operator determining system 100A is designed such that in a case of occurrence of an event, the home appliance 10A (i) carries out a BLE communication so as to conduct a search for a presence of a registered communication terminal device 20A which is present within the first predetermined distance from the home appliance 10A and (ii) determines that the user(s) of a registered communication terminal device(s) 20A detected can be the operator. Then, in a case where a single registered communication terminal device 20A is present within the first predetermined distance, the user of the single registered communication terminal device 20A is identified as the operator. In a case where a plurality of registered communication terminal devices 20A are present within the first predetermined distance, narrowing down is performed with use of radio field intensities of the plurality of registered communication terminal devices 20A. In a case where the radio field intensities are identical to each other, further narrowing down is performed with use of user information and identification information, so that, in a case where a single registered communication terminal device 20A remains as a result of the narrowing down, the user of the single registered communication terminal device 20A is identified as the operator of the home appliance 10A.

Accordingly, it is possible to determine, at minimum cost, a presumable operator who has operated a door or a button of the home appliance 10A or operated the home appliance 10A by voice control. As a result, when applied to, for example, a home appliance which is IoT-based, the presumable operator determining system 100A allows providing, at minimum cost, a service suitable for each user who has operated the home appliance.

Embodiment 3

Figure 10:
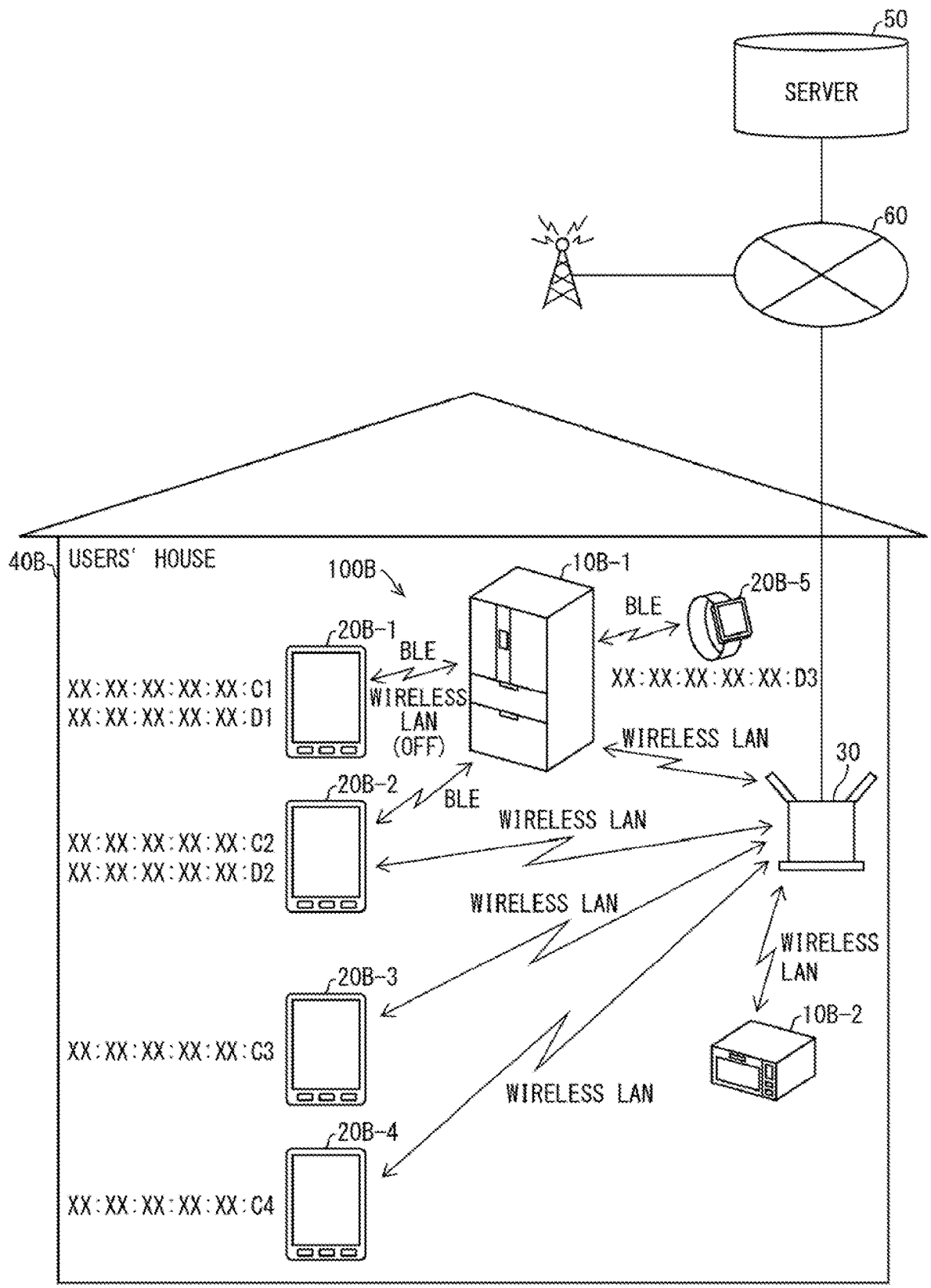
FIG. 10 is a conceptual view schematically illustrating a configuration of a presumable operator determining system in accordance with another embodiment of the present invention.
Figure 12:
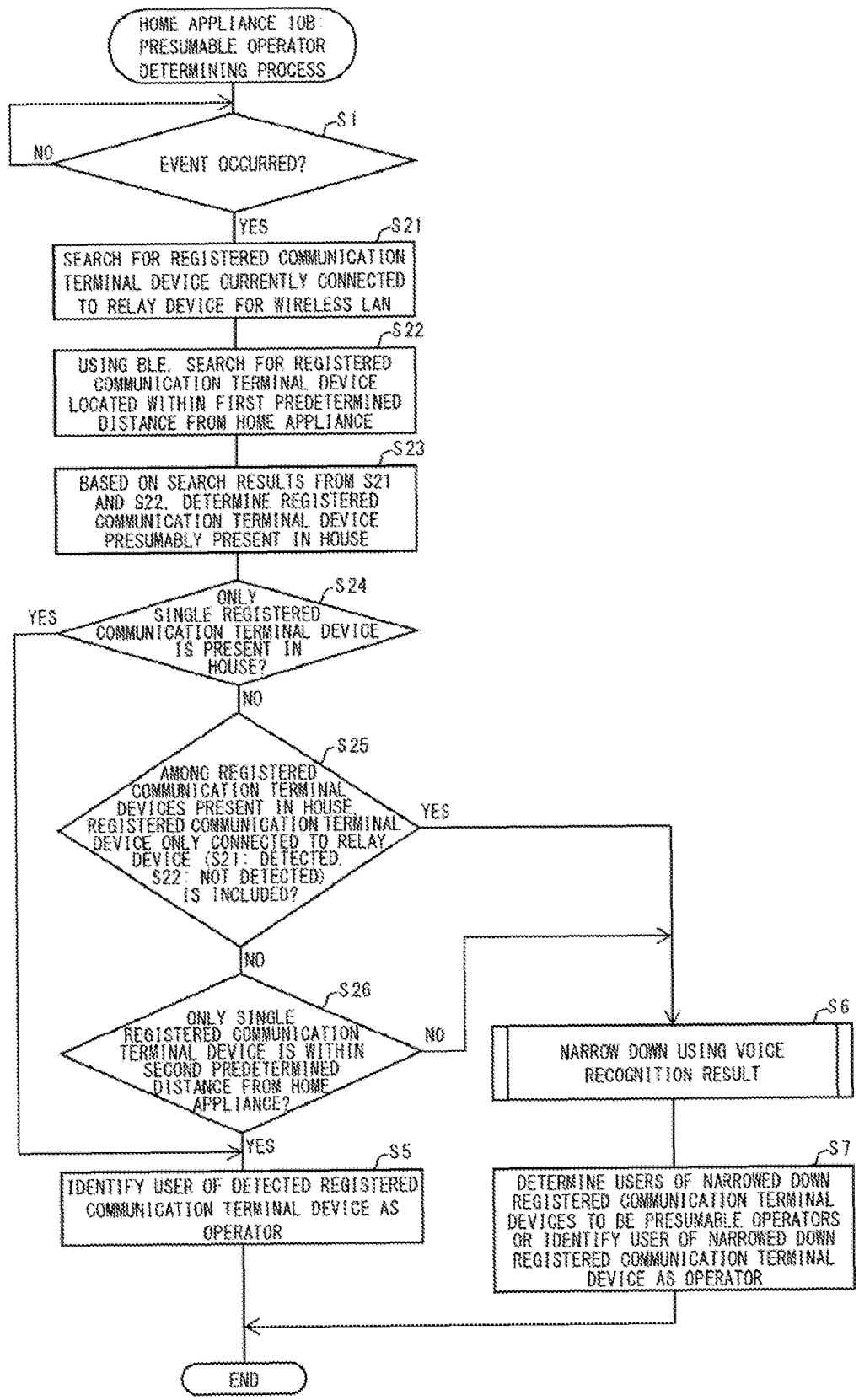
FIG. 12 is a flowchart of a presumable operator determining process carried out by the home appliance of the presumable operator determining system of FIG. 10.

The following description will discuss Embodiment 3 of the present invention with reference to FIGS. 10 through 12. For easy explanation, the same reference signs will be given to members having the same function as a member described in Embodiments 1 and 2, and descriptions on such a member will be omitted.

In a presumable operator determining system in accordance with Embodiment 3, (i) a communication terminal device having both a wireless LAN function and a BLE function, (ii) a communication terminal device having only a wireless LAN function, and (iii) a communication terminal device having only a BLE function are each used as a communication terminal device which is carried by each user who is to be an operator of a home appliance and brought along by the user when the users go out. With respect to each of the communication terminal devices, the home appliance carries out both (i) a determination of whether or not the each of the communication terminal devices is currently connected to a relay station 30 for wireless LAN and (ii) a determination with use of BLE communications.

FIG. 10 is a conceptual view schematically illustrating a configuration of a presumable operator determining system 100B in accordance with Embodiment 3. As illustrated in FIG. 10, the presumable operator determining system 100B includes (i) a refrigerator 10B-1 and a cooking device 10B-2, each of which is a home appliance provided in a house 40B, (ii) communication terminal devices 20B-1 and 20B-2 each of which has both a wireless LAN function and a BLE function, (iii) communication terminal devices 20B-3 and 20B-4 each of which has only a wireless LAN function, and (iv) a communication terminal device 20B-5 which has only a BLE function, the communication terminal devices 20B-1 through 20B-5 belonging to respective users who operate the refrigerator 10B-1 and the cooking device 10B-2. The home appliance 10B has a similar configuration to that of the home appliance 10A which includes the BLE communication section 16 in addition to the communication section 15 (see FIG. 7).

In the example illustrated in FIG. 10, all of the users of the respective communication terminal devices 20B-1, 20B-2, 20B-3, 20B-4, and 20B-5 are present in the house 40B. Among the users, the user of the communication terminal device 20B-1 has turned off the communication terminal device 20B-1's function of connecting to the relay station 30 for the wireless LAN, and the communication terminal device 20B-1 is thus not connected to the relay station 30. Note that the description below too uses the collective terms "home appliance 10B" and "communication terminal device 20B" in a case where there is no need to describe the above-described devices individually.

In a storage section of the home appliance 10B, as unique information which allows identifying the communication terminal device 20B of each user who can be an operator of the home appliance 10B, for example, a MAC address for wireless LAN and/or a MAC address for BLE is/are pre-registered. FIG. 11 is a view illustrating an example of an information table which is stored in the storage section of the home appliance 10B and in which information used for determining a presumable operator is registered. The example of FIG. 11 represents a case in which users who are to be operators are five members of a family, namely, parents, a brother, an older sister, and a younger sister.

As illustrated in FIG. 11, as unique information allowing the communication terminal devices 20B-1 and 20B-2, each of which has both a wireless LAN function and a BLE function, to be identified, MAC addresses (XX:XX:XX:XX:XX:C1, XX:XX:XX:XX:XX:C2) for wireless LAN and MAC addresses (XX:XX:XX:XX:XX:D1, XX:XX:XX:XX:XX:D2) for BLE are registered with respect to the users "father" and "mother", who are the users of the respective communication terminal devices 20B-1 and 20B-2. Further, as unique information allowing the communication terminal devices 20B-3 and 20B-4, each of which has only a wireless LAN function, to be identified, MAC addresses (XX:XX:XX:XX:XX:C3, XX:XX:XX:XX:XX:C4) for wireless LAN are registered with respect to the users "brother" and "older sister", who are the users of the respective communication terminal devices 20B-3 and 20B-4. Still further, as unique information allowing the communication terminal device 20B-5, which has only a BLE function, to be identified, a MAC address (XX:XX:XX:XX:XX:D3) for BLE is registered with respect to the user "younger sister", who is the user of the communication terminal device 20B-5. Note that, as with Embodiment 1, information of the "sex" and "age"

of each user is also registered as user information which can be used for identifying the user. Hereinafter, a communication terminal device 20B whose unique information is registered will be referred to as a registered communication terminal device 20B.

In a configuration in which both (i) a determination of whether or not a communication terminal device 20B is connected to the relay station 30 for the wireless LAN and (ii) a determination with use of BLE communications are used, the control section (presumable operator determining section) of the home appliance 10B sequentially carries out the determination of whether or not a communication terminal device 20B is connected to the relay station 30 for the wireless LAN and the determination with use of BLE communications, and on the basis of results of these determinations, the control section determines a registered communication terminal device(s) 20B which is/are presumably present in the house 40B. Then, in a case where only a single registered communication terminal device 20B is present in the house 40B, the control section identifies the user of the single registered communication terminal device 20B as the operator. Meanwhile, in a case where a plurality of registered communication terminal devices 20B are present in the house 40B, the control section further conducts narrowing down, as described below, with use of (i) results of "sex recognition" and/or "generation recognition" or (ii) a distance from each of the plurality of registered communication terminal devices 20B to the home appliance 10B, which distance is determined on the basis of radio field intensity of BLE communication.

FIG. 12 is a flowchart of a presumable operator determining process carried out by the home appliance 10B of the presumable operator determining system 100B in accordance with Embodiment 3. The control section of the home appliance 10B is always performing detection of whether or not an event has occurred (S1). In a case where an event occurs and the control section thus determines YES at S1, the control section conducts a search for a registered communication terminal device 20B connected to the relay station 30 (S21) and then conducts a search for a presence of a registered communication terminal device 20B which is located within a first predetermined distance from the home appliance 10B (S22). Subsequently, on the basis of results of the searches at S21 and S22, the control section determines a presumable registered communication terminal device(s) 20B which is/are presumably present in the house 40B (S23).

Subsequently, the control section determines whether or not only a single registered communication terminal device 20B has been determined at S23 as presumably being present in the house 40B (S24). In a case where the control section determines YES at S24, the control section identifies the user of the single registered communication terminal device 20B, which has been detected, as the operator (S5). Meanwhile, in a case where a plurality of registered communication terminal devices 20B are present (have been determined as presumably being present) in the house 40B and the control section thus determines NO at S24, the control section proceeds to S25. At S25, the control section determines whether or not a registered communication terminal device(s) 20B which is/are only connected to the relay device 30 is/are included among the plurality of registered communication terminal devices 20B. In a case where the control section determines YES at S25, the control section proceeds to S6 and performs narrowing down with use of results of voice recognition. The control section determines users remaining through the narrowing down at S6 to be presumable operators, and in a case where a single user is remaining through the narrowing down, the control section identifies the single user as the operator (S7).

Meanwhile, in a case where no registered communication terminal device 20B which is only connected to the relay device 30 is not included among the plurality of registered communication terminal devices 20B and the control section thus determines NO at S25, the control section proceeds to S26 and determines whether or not only a single registered communication terminal device 20B is located within a second predetermined distance from the home appliance 10B. The second predetermined distance is a distance which is shorter than the first predetermined distance and is, for example, 50 cm. In a case where the control section determines YES at S26, the control section identifies the user of the single registered communication terminal device 20B, which has been detected, as the operator (S5).

Meanwhile, in a case a plurality of registered communication terminal devices 20B are located within the second predetermined distance from the home appliance 10B and the control section thus determines NO at S26, the control section proceeds to S6. At S6, the control section performs narrowing down with use of results of voice recognition. The control section determines users who are remaining as a result of the narrowing down at S6 as presumable operators, and in a case where a single user remains as a result of the narrowing down, the control section identifies the single user as the operator (S7).

Note here that although not shown in the flowchart of FIG. 12, a communication terminal device that has a BLE function and is not a registered communication terminal device 20B is also detected at S22. As such, at S22, a registered communication terminal device(s) 20B is/are extracted with use of MAC addresses for BLE. Also note that in a case where no registered communication terminal device 20B is present in the house 40B at S24, the control section ends the process.

The second predetermined distance is not limited to 50 cm, and may be 100 cm instead. That is, the second predetermined distance only needs to make it possible that registered communication terminal devices 20B which have a BLE function and which have been determined to be presumably present in the house 40B due to being located within the first predetermined distance can be narrowed down, with use of a distance between each of the registered communication terminal devices 20B and the home appliance 10B (the distance is determined on the basis of radio field intensity of BLE communication), to a registered communication terminal device(s) 20B which is/are closer to the home appliance 10B.

As described above, in the presumable operator determining system 100B in accordance with Embodiment 3, the home appliance 10B carries out both (i) a determination of whether or not a communication terminal device 20B is currently connected to the relay station 30 for the wireless LAN and (ii) a determination with use of BLE communications. As such, even in a case where the presumable operator determining system 100B includes (i) the registered communication terminal device 20B-1, which has been disconnected from the relay station 30 for the wireless LAN as illustrated in FIG. 10, (ii) the registered communication terminal devices 20B-3 and 20B-4 each of which has only a wireless LAN function, and (iii) the registered communication terminal device 20B-5 which has only a BLE function, it is possible to identify an operator of the home appliance 10B or determine a presumable operator of the home appliance 10B, on the basis of the presence of these registered communication terminal devices.

Note that although the flowchart of FIG. 12 shows a configuration in which connection to the relay station 30 is checked first, it is also possible to employ a configuration in which presence of a communication terminal device 20B which is located within a predetermined distance can be checked with use of BLE communications first.

Further, although Embodiments 1 through 3 have described configurations in which the presumable operator determining sections 114 and 114A are provided in the control sections 11 and 11A of the home appliances 10, 10A, and 10B, the presumable operator determining sections 114 and 114A may be provided in the server 50 instead. It is also possible to employ a configuration in which information in the storage section (as shown in FIG. 11) is provided in the server 50. Further, although the above descriptions have discussed a configuration in which a voice recognition function of the server 50 is used by the home appliances 10, 10A, and 10B, it is also possible to employ a configuration in which a home appliance itself has a voice recognition function.

Embodiment 4

Control blocks of the home appliances 10, 10A, and 10B (particularly, the presumable operator determining sections 114 and 114A) may be realized by a logic circuit (hardware) provided in an integrated circuit (IC chip) or the like or may be realized by software as executed by a CPU (Central Processing Unit).

In the latter case, each of the home appliance 10, 10A, and 10B includes: a CPU that executes instructions of a program that is software realizing the foregoing functions; ROM (Read Only Memory) or a storage device (each referred to as "storage medium") storing the program and various kinds of data in such a form that they are readable by a computer (or a CPU); and RAM (Random Access Memory) that develops the program in executable form. The object of the present invention can be achieved by a computer (or a CPU) reading and executing the program stored in the storage medium. The storage medium may be "a non-transitory tangible medium" such as a tape, a disk, a card, a semiconductor memory, and a programmable logic circuit. Further, the program may be made available to the computer via any transmission medium (such as a communication network and a broadcast wave) which enables transmission of the program. Note that the present invention can also be implemented by the program in the form of a computer data signal embedded in a carrier wave which is embodied by electronic transmission.

[Recap]

A presumable operator determining system 100, 100A, 100B in accordance with Aspect 1 of the present invention is a presumable operator determining system which determines a presumable operator who is presumably an operator who has operated an electrical apparatus (home appliance 10, 10A, 10B) provided in a house, including: a storage section 12, 12A storing therein unique information of respective communication terminal devices 20, 20A, 20B such that the unique information are respectively associated with users who operate the electrical apparatus, the communication terminal devices 20, 20A, 20B being respectively carried by the users and brought along by the users when the users go out; and a presumable operator determining section 114, 114A configured to, in a case where the electrical apparatus is operated, (i) conduct a search, with use of a communication section 15 (BLE communication section 16) included in the electrical apparatus, for a communication terminal device 20, 20A, 20B which is determinable as presumably being present in the house among the communication terminal devices 20, 20A, 20B whose unique information are stored in the storage section 12, 12A and (ii) determine a presumable operator who is presumably an operator who has operated the electrical apparatus from among a user(s) associated with at least one terminal device 20, 20A, 20B detected through the search.

According to the above configuration, in the storage section, unique information of respective communication terminal devices 20, 20A, 20B are stored such that the unique information are respectively associated with users who operate the electrical apparatus, the communication terminal devices 20, 20A, 20B being respectively carried by the users and brought along by the users when the users go out. In a case where the electrical apparatus is operated, the presumable operator determining section 114, 114A (i) conducts a search, with use of the communication section included in the electrical apparatus, for a communication terminal device 20, 20A, 20B which is determinable as presumably being present in the house among the registered communication terminal devices 20, 20A, and 20B whose unique information are stored in the storage section 12, 12A and (ii) determines a presumable operator who is presumably an operator who has operated the electrical apparatus from among a user(s) associated with at least one terminal device 20, 20A, 20B detected through the search.

This enables determining, at minimum cost, a presumable operator who has operated a door or a button of the electrical apparatus or operated the electrical apparatus by voice control. As a result, when applied to, for example, a home appliance which is IoT-based, the presumable operator determining system 100, 100A, 100B allows providing, at minimum cost, a service suitable for each user who has operated the home appliance.

In Aspect 2 of the present invention, the presumable operator determining system 100, 100B is further configured such that in a case where the communication terminal devices 20, 20B are connected to a localized communication network (wireless LAN) provided in the house, the presumable operator determining section 114 determines that the communication terminal devices 20, 20B are presumably present in the house.

It is becoming common that an Internet environment is changed from LTE or the like to a wireless LAN connection such as WiFi (registered trademark) when a communication terminal device such as a smartphone or a mobile phone is used in a house. As such, according to the above configuration, in a case where a registered communication terminal device 20, 20B is connected to a localized communication network, the registered communication terminal device 20, 20B can be determined as presumably being present in the house.

In Aspect 3 of the present invention, the presumable operator determining system 100A, 100B is further configured such that: the communication terminal devices 20A, 20B and the communication section (BLE communication section 16) included in the electrical apparatus each have a BLE communication function; and in a case where the communication terminal devices 20A, 20B are detected with use of the BLE communication function, the presumable operator determining section 114A determines that the communication terminal devices 20A, 20B are presumably present in the house.

BLE communications involve a small-sized communication device and achieve extremely low power consumption. In a BLE communication, presence of another communication terminal device and a radio field intensity of the communication can be detected without performing paring, and it is possible to determine a distance between BLE communication devices on the basis of the radio field intensity of the communication. As such, according to the above configuration, in a case where a registered communication terminal device 20A, 20B that is capable of carrying out a BLE communication with the electrical apparatus is detected, the registered communication terminal device 20A, 20B can be determined as presumably being present in the house.

In Aspect 4 of the present invention, the presumable operator determining system 100, 100A, 100B may be further configured such that in a case where the at least one communication terminal device 20, 20A, 20B detected as presumably being present in the house is a plurality of communication terminal devices 20, 20A, 20B, the presumable operator determining section 114, 114A narrows down a plurality of users corresponding to the plurality of communication terminal devices 20, 20A, 20B detected, for determining a user who is a presumable operator.

By narrowing down, for determining a user who is a presumable operator, the plurality of users corresponding to the plurality of communication terminal devices 20, 20A, 20B connected, it is possible to increase accuracy of the determination.

In Aspect 5 of the present invention, the presumable operator determining system 100, 100A, 100B is further configured such that: the storage section 12, 12A stores therein user information which is recognizable from a voice of each of the users and is usable for identifying the each of the users; and the presumable operator determining section 114, 114A narrows down the plurality of users on the basis of (i) identification information obtained by performing voice recognition of a voice inputted through a voice input section provided in the electrical apparatus and (ii) the user information stored in the storage section 12, 12A.

Performing voice recognition of a voice of an operator allows recognizing the sex and generation of the operator. As such, by pre-registering, as user information, the sex and age of each user who is to be an operator, it becomes possible to narrow down users with use of results of voice recognition.

In Aspect 6 of the present invention, the presumable operator determining system 100, 100A, 100B is further configured such that in a case where the electrical apparatus is operated by a method other than voice control, the presumable operator determining section 114, 114A calls the operator, with use of a voice output section 13 included in the electrical apparatus, so as to encourage the operator to speak.

In a case where the electrical apparatus is operated by a method other than voice control, it is not possible to perform narrowing down with use of results of voice recognition. As such, by employing the above configuration in which the electrical apparatus calls the operator so as to encourage the operator to speak, it is possible to perform narrowing down with use of results of voice recognition.

In Aspect 7 of the present invention, the presumable operator determining system 100A, 100B can be configured such that in a case where the at least one communication terminal device 20A, 20B detected as presumably being present in the house is a plurality of communication terminal devices 20A, 20B, the presumable operator determining section 114A narrows down, on the basis of radio field intensity of BLE communication, a plurality of users corresponding to the plurality of communication terminal devices 20A, 20B detected, for determining a user who is a presumable operator.

As described above, it is possible to detect a radio field intensity of a BLE communication and determine that a communication terminal device 20A, 20B having the highest radio field intensity is located closest to the electrical apparatus. As such, according to the above configuration, it is possible to narrow down users on the basis of radio field intensity.

In Aspect 8 of the present invention, the presumable operator determining system 100, 100A, 100B is further configured such that the electrical apparatus is connected to a server 50 via a wide area communication network 60.

According to the above configuration in which the electrical apparatus is connected to the server 50, a function of the electrical apparatus which function is necessary for determining a presumable operator can be imparted to the server.

The present invention is not limited to the above-described embodiments but allows various modifications. Any embodiment derived from an appropriate combination of the technical means disclosed in the different embodiments will also be included in the technical scope of the present invention. Further, a new technical feature can be made by combining technical means disclosed in the respective embodiments.

REFERENCE SIGNS LIST 10, 10A, 10B: home appliance (electrical apparatus)
11, 11A: control section
12, 12A: storage section
13: voice output section
14: voice input section
15: communication section
16: BLE communication section
20, 20A, 20B: communication terminal device
30: relay station (localized communication network)
50: server
60: wide area communication network
100, 100A, 100B: presumable operator determining system
111: voice output control section
112: voice input control section
113: communication control section
114, 114A: presumable operator determining section

The invention claimed is:

1. A presumable operator determining system which determines a presumable operator who is presumably an operator who has operated an electrical apparatus provided in a house, comprising:
   a storage section storing therein unique information of respective communication terminal devices such that the unique information are respectively associated with users who operate the electrical apparatus, the communication terminal devices being respectively carried by the users and brought along by the users when the users go out; and
   a presumable operator determining section configured to, in a case where the electrical apparatus is operated, (i) conduct a search, with use of a communication section included in the electrical apparatus, for a communication terminal device which is determinable as presumably being present in the house among the communication terminal devices whose unique information are stored in the storage section and (ii) determine a presumable operator who is presumably an operator who has operated the electrical apparatus from among a user(s) associated with at least one terminal device detected through the search.

2. The presumable operator determining system as set forth in claim 1, wherein in a case where the communication terminal devices are connected to a localized communication network provided in the house, the presumable operator determining section determines that the communication terminal devices are presumably present in the house.

3. The presumable operator determining system as set forth in claim 1, wherein:

the communication terminal devices and the communication section included in the electrical apparatus each have a BLE (Bluetooth (registered trademark) Low Energy) communication function; and in a case where the communication terminal devices are detected with use of the BLE communication function, the presumable operator determining section determines that the communication terminal devices are presumably present in the house.

4. The presumable operator determining system as set forth in claim 1, wherein in a case where the at least one communication terminal device detected as presumably being present in the house is a plurality of communication terminal devices, the presumable operator determining section narrows down a plurality of users corresponding to the plurality of communication terminal devices detected, for determining a user who is a presumable operator.

5. The presumable operator determining system as set forth in claim 4, wherein:

the storage section stores therein user information which is recognizable from a voice of each of the users and is usable for identifying the each of the users; and the presumable operator determining section narrows down the plurality of users on the basis of (i) identification information obtained by performing voice recognition of a voice inputted through a voice input section provided in the electrical apparatus and (ii) the user information stored in the storage section.

6. The presumable operator determining system as set forth in claim 5, wherein in a case where the electrical apparatus is operated by a method other than voice control, the presumable operator determining section calls the operator, with use of a voice output section included in the electrical apparatus, so as to encourage the operator to speak.

7. The presumable operator determining system as set forth in claim 3, wherein in a case where the at least one communication terminal device detected as presumably being present in the house is a plurality of communication terminal devices, the presumable operator determining section narrows down, on the basis of radio field intensity of BLE communication, a plurality of users corresponding to the plurality of communication terminal devices detected, for determining a user who is a presumable operator.

8. The presumable operator determining system as set forth in claim 1, wherein the electrical apparatus is connected to a server via a wide area communication network.

* * * * *